(12) United States Patent
Tschekalinskij et al.

(10) Patent No.: US 11,977,248 B2
(45) Date of Patent: May 7, 2024

(54) OPTICAL FILTER WITH NANOSTRUCTURED LAYERS AND SPECTRAL SENSOR HAVING LAYERS OF SUCH KIND

(71) Applicant: Fraunhofer-Gesellschaft zur Foerderung der angewandten Forschung e.V., Munich (DE)

(72) Inventors: Wladimir Tschekalinskij, Nuremberg (DE); Stephan Junger, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 57 days.

(21) Appl. No.: 17/375,099

(22) Filed: Jul. 14, 2021

(65) Prior Publication Data

US 2022/0019010 A1    Jan. 20, 2022

(30) Foreign Application Priority Data

Jul. 16, 2020    (DE) .......................... 102020118842.0

(51) Int. Cl.
*G02B 5/30*    (2006.01)
*G02B 5/18*    (2006.01)

(52) U.S. Cl.
CPC ......... *G02B 5/3025* (2013.01); *G02B 5/1809* (2013.01)

(58) Field of Classification Search
CPC ........ G02B 5/008; G02B 1/002; G02B 1/007; G02B 26/06; G02B 1/005; G02B 5/20; G02B 5/1809; G02B 5/3025; G02F 1/292; G02F 2202/30
See application file for complete search history.

(56) References Cited

U.S. PATENT DOCUMENTS

| | | |
|---|---|---|
| 2003/0103150 A1 | 6/2003 | Catrysse et al. |
| 2006/0204163 A1 | 9/2006 | Momoki et al. |
| 2006/0209413 A1* | 9/2006 | Kim .......................... G01J 3/26 |
| | | 359/577 |
| 2013/0057738 A1 | 3/2013 | Konno et al. |

(Continued)

OTHER PUBLICATIONS

E. Sakat et al., "Free-standing guided-mode resonance band-pass filters: from 1D to 2D structures," Optical Society of America, Optics Express (Jun. 4, 2012) vol. 20, No. 12, pp. 13082-13090.

(Continued)

*Primary Examiner* — Jonathan Y Jung
(74) *Attorney, Agent, or Firm* — Renner, Kenner, Greive, Bobak, Taylor & Weber Co., LPA (57) ABSTRACT

The present invention relates to an optical filter with nanostructured layers and spectral sensors with layers of such kind. The optical filter has at least two nanostructured layers, each of which forms a transmission grating from grating wires extending parallel to each other. The grating wires of the two transmission gratings intersect each other and are positioned one on top of the other in the optical filter. An optical polarise which polarises incident optical radiation linearly parallel to the grating wires of one of the two transmission gratings is arranged over the transmission gratings. The optical filter can be produced as a bandpass filter with standard semiconductor processes without additional layers or modification of said processes.

9 Claims, 12 Drawing Sheets

(56) References Cited

U.S. PATENT DOCUMENTS

2013/0314784 A1* 11/2013 Fattal .................. G02B 5/3025
                                                        359/489.08
2017/0059777 A1*  3/2017 Han ...................... G02B 5/288
2020/0201111 A1   6/2020 Williams et al.
2021/0191141 A1*  6/2021 Park .................... G02B 27/288

OTHER PUBLICATIONS

P.B. Catrysse et al., "Integrated Color Pixels in 0.18-μm Complementary Metal Oxid Semiconductor Technology," J. Opt. Soc. Am. A (2003), vol. 20, No. 12, pp. 2293-2306.

* cited by examiner

OPTICAL FILTER WITH NANOSTRUCTURED LAYERS AND SPECTRAL SENSOR HAVING LAYERS OF SUCH KIND

TECHNICAL FIELD

The present invention relates to an optical filter with nanostructured layers including at least a first nanostructured layer which forms a first transmission grating from grating wires extending parallel to each other, and a second nanostructured layer which forms a second transmission grating from grating wires extending parallel to each other. The invention also relates to two spectral sensors having nanostructured layers of such kind.

Spectral sensors are needed in many technical areas. Such sensors often have to be produced using semiconductor manufacturing techniques and are implemented for example as optical colour sensors in colorimeters for colour recognition in printing presses and the textile industry, for colour control of LED lamps, or in analysis. The spectral sensors include one or more photodetectors and typically require one or more optical filters, in particular optical bandpass filters for spectral filtering of the incident optical radiation.

Optical bandpass filters with a small filter bandwidth and high transmission may be produced using dielectric thin film filter systems. These typically consist of more than 50 layers, which are applied by evaporation deposition for example. A variation of the filter wavelength is only enabled by variation of the layer thicknesses used, which makes arranging different filters side by side enormously complicated.

In order to produce spectral sensors using semiconductor manufacturing processes, it is desirable to be able to produce the necessary optical filters with these same semiconductor manufacturing processes as well. Thus for example, in the past CFA (Colour Filter Arrays) from pigment filters have often been used to produce image sensors in CMOS processes. However, these filters are only available for red, green and blue and are therefore not suitable for precise spectral or quasi-spectral measurements involving more than three channels or for spectroscopic measurement tasks. Consequently, it is not possible to make multispectral sensors with significantly more than three channels and "chip-size" spectrometers directly using standard semiconductor technologies.

For several reasons, optical bandpass filters which are produced with the aid of optical nanostructures, for example by arrays of sub-wavelength apertures as plasmonic structures in thin metal layers, cannot be created using standard semiconductor processes. These structures normally require one or two additional metal layers. When the metal layers present in standard CMOS processes are used, the resulting filter transmission is again too low.

RELATED ART

Optical filters can also be produced by grid-like metal nanostructures. With these metal nanostructures, a specific, constant layer thickness is used, wherein the filter wavelength can be varied simply by the lateral dimensioning of the nanostructures in the metal layer. A filter structure of such kind is advantageous for manufacturing in the context of semiconductor processes, a CMOS process for example, because in such cases it is essential to sued layers with constant thickness. In this way, it is possible to provide a very large number of photodiodes with different filters without the need to apply and structure an additional layer subsequently. By combining a photodiode array with a filter array from various filters of such kind, different spectral channels can be combined on one chip, not only for single colour sensors but also for the pixels of an image sensor. This solution is particularly attractive for modern multispectral image sensors, since the alternative of applying the thin film filter with spectral filtering that is differentiated by the pixel becomes increasingly difficult as the pixels become steadily smaller.

An optical filter with nanostructured layers which can be manufactured with CMOS technology is known form the publication by von P. B. Catrysse et al., "Integrated Color Pixels in 0.18-μm Complementary Metal Oxid Semdconductor Technology", J. Opt. Soc. Am. A (2003), Vol. 20, No. 12, pages 2293 to 2306. In this case, the optical filter has either a nanostructured layer auf which forms a transmission grating from grating wires which extend parallel to each other, or two such layers which are arranged one on top of the other. In this case, the grating wires of the transmission grating in the two layers extend parallel to each other. The distance between the two transmission gratings is selected such that a Fabry-Perot resonance effect is produced for a certain spectral range. With a design of such kind, the spectral characteristic of the optical filter can be altered using the grating parameters of the two transmission gratings. However, use of the Fabry-Perot effect entails varying the distance between the two nanostructured layers for resonances for different filter wavelengths as well. For this reason, it is not possible to produce several of these filters with different filter wavelengths side by side in a CMOS process with constant layer thicknesses.

The object of the present invention consists in providing an optical filter and spectral sensors which can be manufactured directly in semiconductor processes, in particular CMOS processes, such as are used in the production of optical sensors and image sensors without modifying said processes.

SUMMARY OF THE INVENTION

This object is solved with the optical filter according to Claim 1 and with the spectral sensors of the present invention. Advantageous variants of the optical filter and spectral sensors are the object of the dependent claims or are discernible from the following description and embodiments.

The suggested optical filter includes a layer stack with at least a first nanostructured layer and a second nanostructured layer positioned on top of the first nanostructured layer. The first nanostructured layer forms a first transmission grating from grating wires which extend parallel to each other, the second nanostructured layer forms a second transmission grating from grating wires which extend parallel to each other. In this context, nanostructuring is understood to mean that the grating wires and/or the gaps between the grating wires in the layer level are <10 μm wide. The optical filter is characterized in that the grating wires of the first transmission grating are aligned at an angle (≠0°) relative to the grating wires of the second transmission grating, and that an optical polarises is arranged, for example as a polarisation layer, over the second nanostructured layer, preferably also as part of the layer stack, and polarises incident optical radiation linearly parallel to the grating wires of one of the two transmission gratings. In this context, the linear polarisation refers to the vector of the electrical field. Thus, the grating wires of the first transmission grating do not extend parallel to the grating wires of the second transmission grating, with the result that two intersecting gratings are created. In the suggested optical filter, further metal and/or dielectric layers may also be present between the two nanostructured layers and/or between the second nanostructured layer and the polariser, and these must be transparent at least for the spectral component of the incident optical radiation for which the filter is to be passable.

The first suggested spectral sensor has at least one photodetector, in particular a photodiode, in front of which a layer stack consisting of dielectric and structured metal layers is formed, and the suggested optical filter is arranged. The two nanostructured layers of the optical filter are formed in this layer stack of the sensor. The sensor is preferably furnished with several of the photodetectors with the associated optical filter side by side on a substrate. Some or all optical filters are constructed in such manner that they have differing spectral characterstics, in particular they form one optical bandpass each for various spectral ranges. In this way, a multispectral sensor may can be created.

The second suggested spectral sensor is based on the same filtering principle as the first spectral sensor, but in a different configuration. The second spectral sensor also has two nanostructured layers, but in this case they are not arranged one on top of the other in a layer stack. The first nanostructured layer again forms a first transmission grating from grating wires extending parallel to each other, the second nanostructured layer forms a second transmission grating from grating wires extending parallel to each other. In this variant, the two transmission gratings are arranged above two photodetectors, in particular two photodiodes. The first nanostructured layer is arranged over the first photodetector, the second nanostructured layer is arranged over the second photodetector. In this case too, the grating wires of the first transmission grating are aligned at an angle ($\neq 0°$) relative to the grating wires of the second transmission grating, and an optical polariser is arranged over both nanostructured layers, e.g., as a polarisation layer which polarises incident optical radiation linearly and parallel to the grating wires of one of the two transmission gratings (again with reference to the electrical field vector). A spectral distribution can then be reconstructed from the signals of the two photodetectors as it would be obtained when the optical radiation passed through a combination of the two transmission gratings, that is to say as in the variant of the first spectral sensor. In this context, in a CMOS process the two transmission gratings may each be formed in the same layer over the respective photodetector, for example each in the first or lowest metal layer, or also in different layers, for example the first transmission grating in the second metal layer above the first photodetector and the second transmission grating in the first metal layer over the second photodetector.

The photodetectors are preferably connected to an electronic signal processing unit for this purpose, which calculates a spectral intensity distribution from the signals from the photodetectors and a known spectral transmission characteristic of the two transmission gratings as it would be obtained after the incident optical radiation passed through a combination of the two transmission gratings (that is to say after passing through the first and the second transmission gratings consecutively). In such a case, the electronic signal processing unit, e.g., in the form of a microcontroller, is preferably arranged on the same substrate on which the spectral sensor is formed. In the case of this spectral sensor too, one or more further layers may also be formed between the individual layers, in particular between photodetector and nanostructured layer and between nanostructured layer and polariser, as in the first spectral sensor as well.

The suggested optical filter and the two suggested spectral sensors may be manufactured in standard semiconductor processes, in particular in CMOS processes for the production of optical sensors and image sensors. In this context, the nanostructured layers may each be created in one of the metal layers of constant thickness used there. Particularly in the production of filter and sensor arrays, the creation of multiple optical filters with different filter properties one beside the other does not require any modification of the layer structure. All elements of the array are formed from the same layers, which then only have to be individually structured locally, that is to say in the region of each element. The filter properties are fixed solely by the structuring of the respective layer or layer region by means of the thickness of the grating wires, the period of the grating and the duty cycle (period to width of the grating wires), and optionally by the angle of the grating wires of the different transmission gratings with respect to each other. The distance between the nanostructured layers in the suggested optical filter is not critically important in this context, because it is not intended to create a Fabry-Perot resonator.

In the case of the second spectral sensor, preferably several pairs of photodetectors are implemented with each of the first and second transmission gratings, wherein the grating parameters of one or both transmission gratings in each pair vary from pair to pair, preferably in at least some of the pairs, in order to obtain different characteristics of the respective grating combination or spectral channels of the sensor. The angles of the grating wires in the transmission gratings of each pair may also be varied with respect to each other. As was noted earlier, the same applies for the first spectral sensor. In the case of the first spectral sensor as well, the grating parameters for the two combined transmission gratings preferably vary from photodetector to photodetector as well, at least for some of the photodetectors. Of course, the two spectral sensors may also form groups of photodetectors, each with the same filter properties of the optical filters.

The grating parameters of the two combined transmission gratings are preferably tuned to one another in such manner as to produce a bandpass characteristic for the desired wavelength range. In an advantageous variant of the optical filter and optical sensors the Kerr or Faraday effect is used additionally to change the direction of polarisation of the incident optical radiation after it passes through the polarisation layer and before it reaches the transmission gratings. For this purpose, a layer of an optically anisotropic material is arranged between the transmission gratings and the polarisation layer. In this way, for example, the direction of polarisation may be changed simply, by applying a corresponding voltage through this layer, for example, and so make a precise adjustment to the filter characteristic.

In all cases, the capability further exists to arrange additional filters in the beam path of the optical radiation in order to influence the spectral characteristic further. Examples of such are interference filters or Fabry-Perot filters.

The suggested optical filter and the suggested spectral sensors may be used for example in sensor technology or spectroscopy. An arrangement of for example ten or more such filters on an array of CMOS photodiodes enables creation of a chipsize spectrometer. The filter and sensors may also be used in image sensors, thus making it possible for the first time to create inexpensive multispectral cameras, e.g., for 16 wavelengths with no mechanically moving parts such as filter wheels or complex filter arrays. Even in the event that a small number of channels are used, in analysis for example, the application often requires narrow band optical bandpass filters such as are made available with the present invention.

BRIEF DESCRIPTION OF THE DRAWING

In the following section, the suggested optical filter and the suggested spectral sensors will be explained again in greater detail with reference to exemplary embodiments in conjunction with the drawing. In the drawing.

WAYS TO IMPLEMENT THE INVENTION

Figure 1:
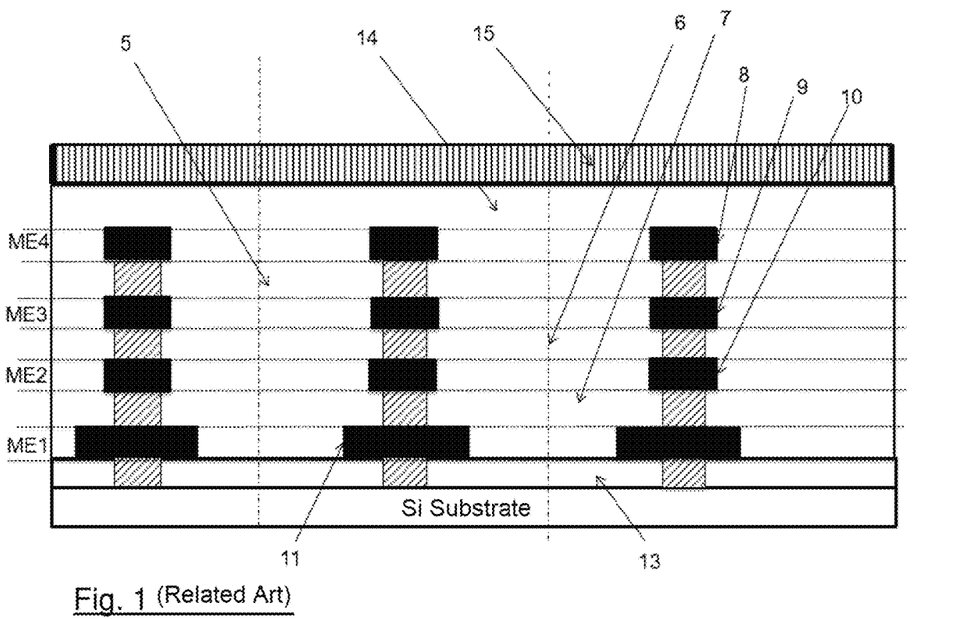
FIG. 1 shows an example of a layer construction of a CMOS process.

The suggested optical filter and the spectral sensors can be produced simply in standard CMOS processes. In this regard, FIG. 1 shows an example of a layer construction of a CMOS process. Illustrated is a sandwich-type structure on a silicon substrate consisting of multiple metal layers 8 to 11 and dielectric layers 5 to 7, 14. In the present case of a spectral sensor, photodiodes 13 are formed in and/or on the silicon substrate. The spectral sensor includes colour filters 15 arranged singly or in arrays. These colour filters or colour filter arrays typically consist of coloured polymer material, for example a CFA or Bayer pattern, or interference filters.

Figure 2:
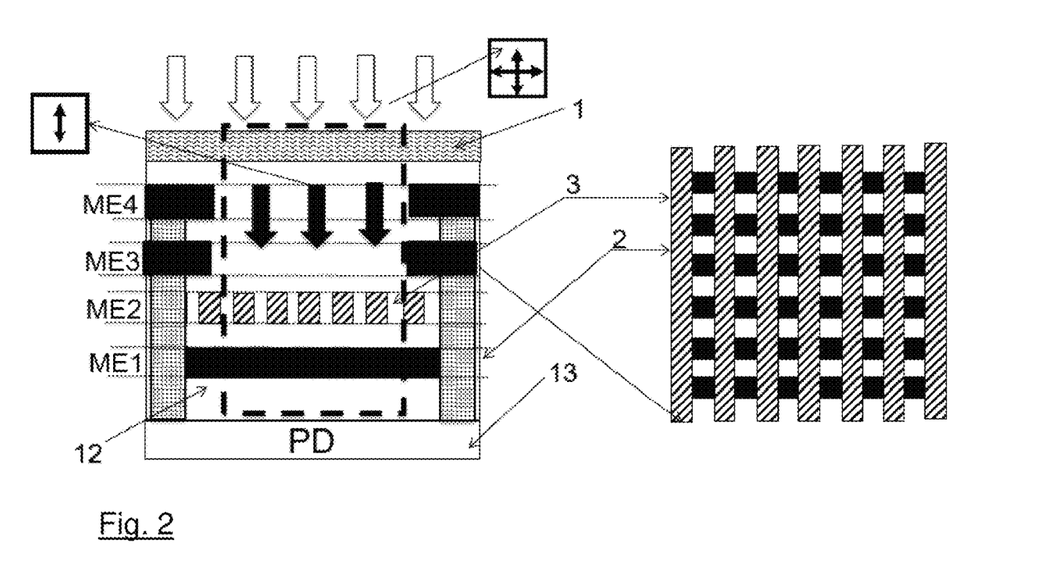
FIG. 2 shows a first example of a variant of the suggested optical filter and first spectral sensor.

In the suggested first spectral sensor, two nanostructured layers as transmission grating layers are used in conjunction with an optical polariser. In this regard, FIG. 2 shows a first example of an optical filter or optical sensor of such kind. All variants of the suggested optical filter are eminently suitable for production in a standard semiconductor process with no technology modifications. The metal layers which are present in any semiconductor process can be used to form the transmission gratings, and no additional thin layers of metal such as aluminium are needed. It is thus possible to create spectral filters, in particular bandpass filters which have good spectral properties and can be manufactured in inexpensive, unmodified semiconductor technologies.

In the example of FIG. 2, two of the metal layers present, namely the bottom layers, i.e. the layers ME1 and ME2 closest to the photodiode 13 are used to form the transmission gratings. Of course, other metal layers may also be used to construct the optical filter. For this purpose, the metal layers are structured as gratings, wherein transmission gratings are each formed with grating wires that extend parallel to each other. The suggested optical filter includes a combination of at least two transmission gratings in the metal layers, as may be discerned in FIG. 2. In this context, the metal layers are structured in such manner that two intersecting transmission gratings 2, 3 are created, each having grating wires that extend parallel to each other. In this example, the angle between the grating wires of the two transmission gratings 2, 3 is 90°. Above these gratings is polarisation layer 1, which only allows passage of a certain direction of polarisation, e.g., TE, which is oriented parallel to the grating wires of one of the two transmission gratings 2, 3. The left side of the figure shows a cross section through the optical sensor with the optical filter, the right side shows a plan view of the two transmission gratings 2, 3 positioned one on top of the other, with the intersecting grating wires.

The incident light is first polarised linearly by the polarisation layer 1 and passes through the apertures in the metal layers ME4 and ME3. In this context, the photodiode 13 is completely covered by the metal layers structured as gratings, that is to say the transmission gratings 2, 3, and converts the passing light into electrical signals.

The transmission spectrum of metal gratings for TE and TM polarisations is known from the related art. For exemplary purposes, FIGS. 3 and 4 each show an example of simulated grating transmission (grating parameters: grating wires of metal, embedded in silicon dioxide, grating period 370 nm) for TM- (FIG. 3) and TE-polarisation (FIG. 4) depending on the wavelength. It is known that the transmission of a grating depends on wavelength in the case of polarised light. In gratings with increasing grating period, both the local minimum (range M) and the falling edge (range F) are shifted to longer wavelengths.

The basic idea of the suggested optical filter consists in using a combination of polariser and two gratings arranged to intersect each other (preferably for TE- and TM-polarisation) to create a filter which has the desired spectral properties. In the variant of FIG. 2, the grating wires of the upper grating 3 are arranged parallel with the polariser axis (TE), and those of the lower grating 4 are arranged perpendicularly to the polariser axis (TM). The periods of the two gratings may be the same or different from one another depending on the intended spectral properties of the filter.

Figure 3:
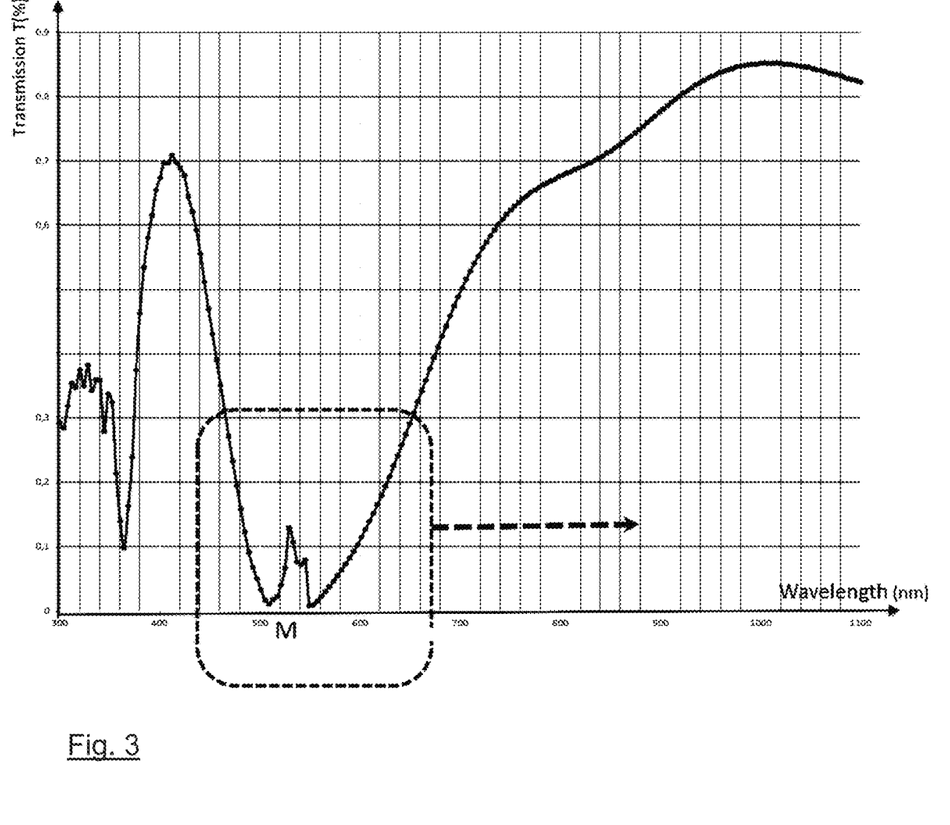
FIG. 3 shows an example of the simulated grating transmission of a first transmission grating.
Figure 4:
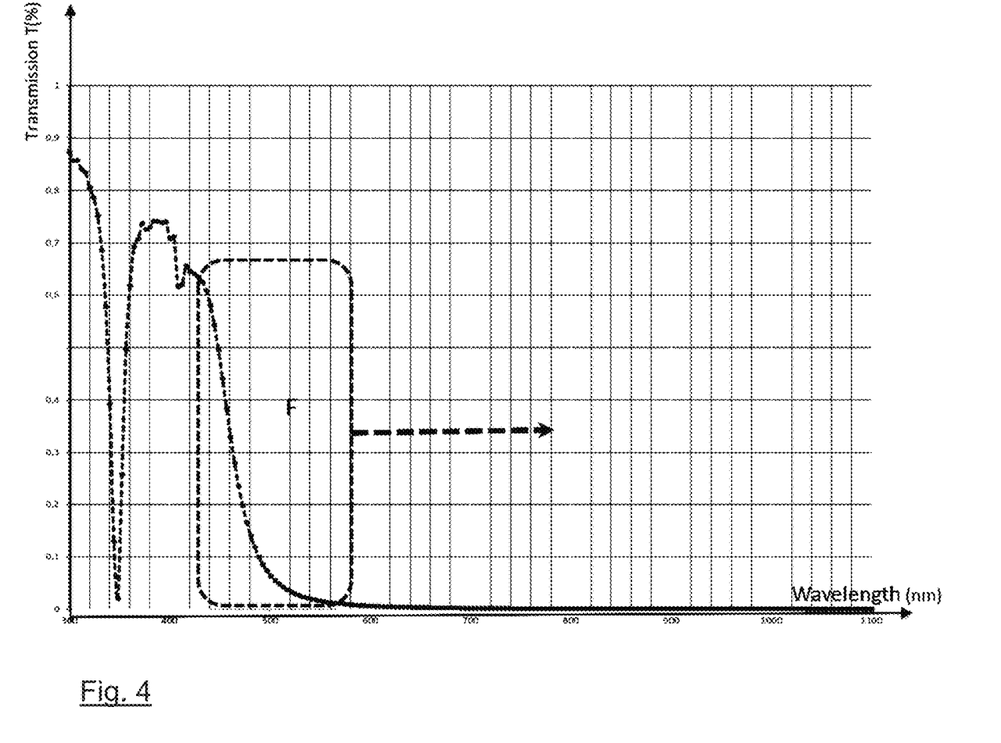
FIG. 4 shows an example of the simulated grating transmission of a second transmission grating.
Figure 5:
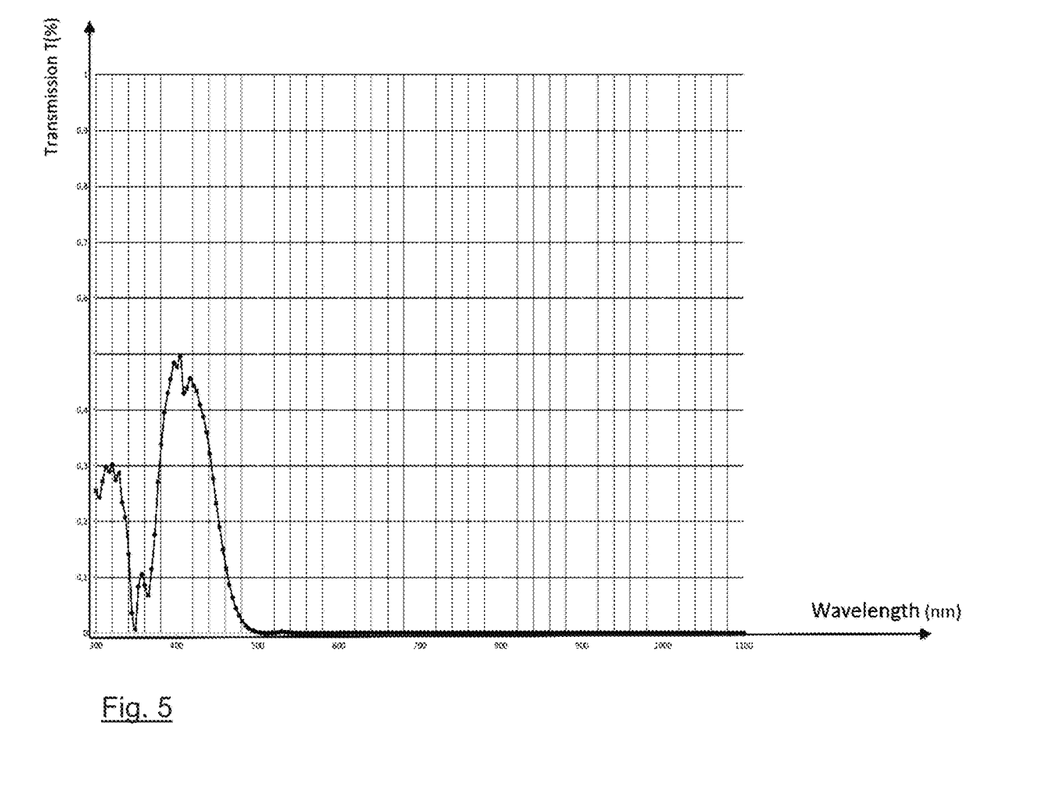
FIG. 5 shows an example of the simulated grating transmission of a combination of the first and second transmission gratings.
Figure 6:
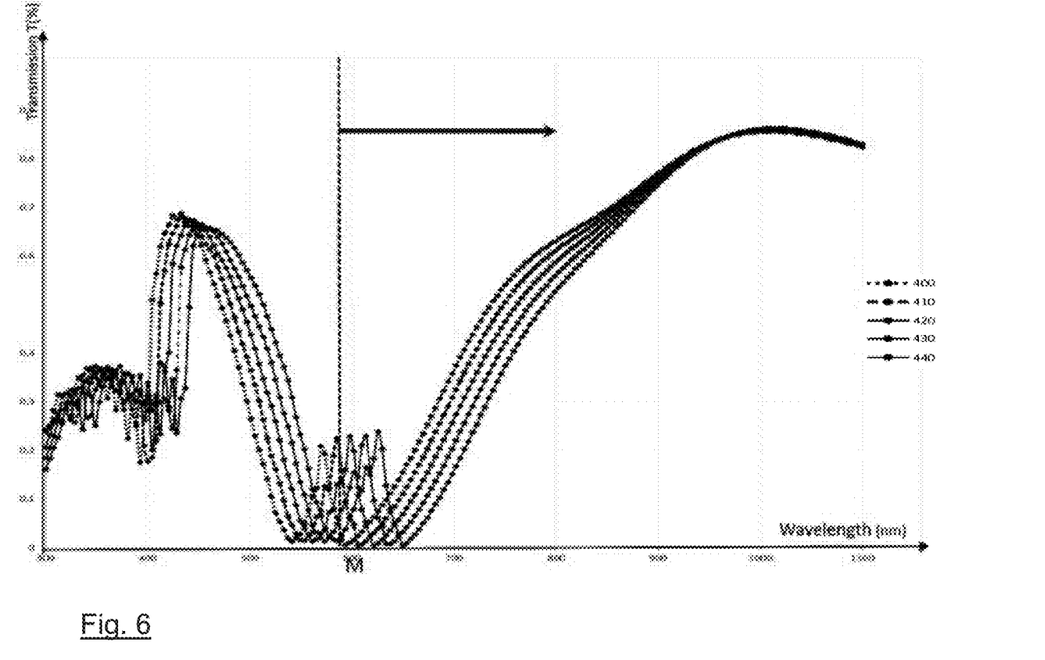
FIG. 6 shows an example of the simulated grating transmission of FIG. 3 with different grating periods.
Figure 7:
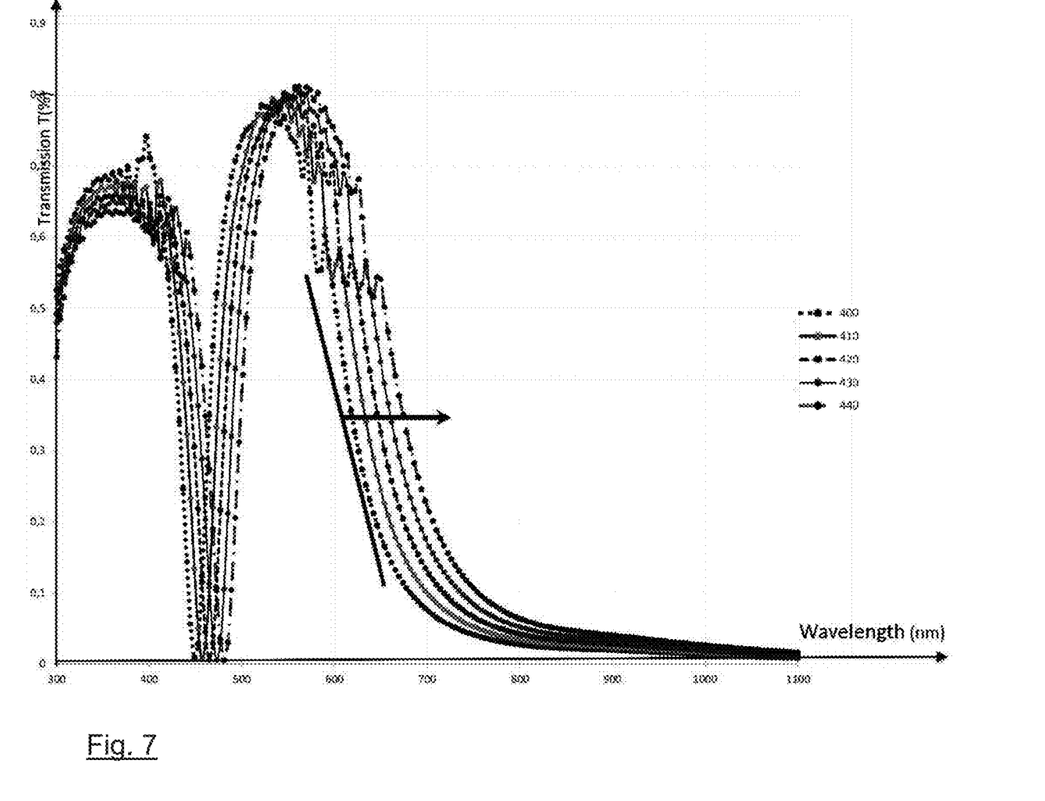
FIG. 7 shows an example of the simulated grating transmission of FIG. 4 with different grating periods.
Figure 8:
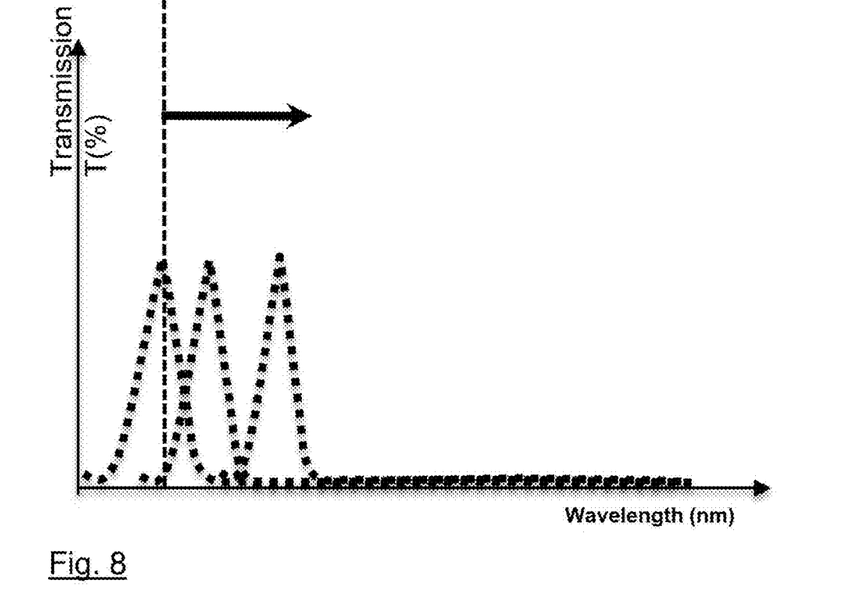
FIG. 8 shows an example of shifting the central wavelength by varying the grating parameters with a combination of the first and second transmission gratings.

FIG. 5 shows the spectral transmission of a bandpass filter such as is created by combining the intersecting transmission gratings 2, 3 having the optical properties of FIGS. 3 and 4, each with a period of 370 nm. The central wavelength, transmission and suppression in the blocking region of filters of such kind is determined primarily by the grating wire width, the period and the duty cycle of the gratings. FIGS. 6 to 8 are based on the parameters of FIGS. 3 to 5 and show how the grating transmission for linearly polarised light changes as a function of the wavelength for gratings with periods from 400 to 440 nm. FIG. 6 then shows that for larger periods the local minimum N shifts to the right for TM polarisation. FIG. 7 shows that the low pass filter edge also migrates to the right towards longer wavelengths for TE polarisation with larger period. The arrows shown in the two figures illustrate this trend. Filters with the desired characteristic can be designed by combining the TE and TM transmission gratings. To this end, FIG. 8 is a schematic representation of the spectral transmission of a bandpass filter with various central wavelengths, such as may be obtained by appropriate design of the two transmission gratings. The central wavelength may be varied by combining the intersecting TE and TM transmission gratings by means of the grating parameters. It is determined most particularly by the width of the grating wires and to a lesser extent by the period of the gratings.

Figure 9:
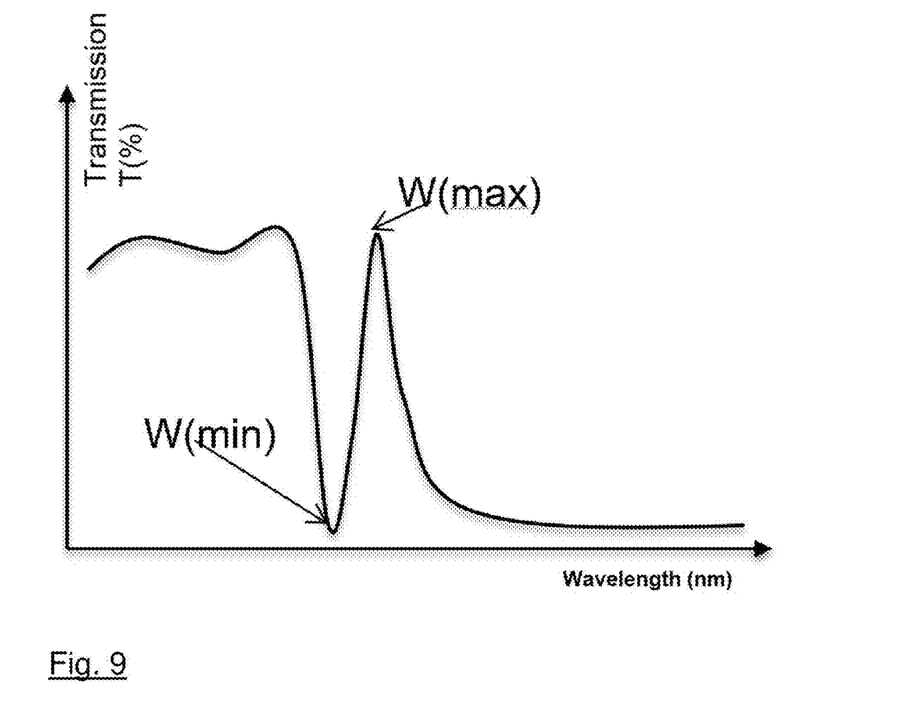
FIG. 9 shows an example of the creation of another filter characteristic through a combination of two transmission gratings.

Other filter characteristics may also be created by the suggested combination of the aforementioned transmission gratings with suitable grating parameters, filters for fluorescence, for example. To this end, FIG. 9 shows the filter characteristic of a filter of such kind, which does not have a bandpass characteristic but is suitable as a filter for fluorescence or luminescence measurements, for the purpose of separating excitation light and emission light from each other. The intensity of emission light is typically weaker than the intensity of excitation light by a factor of 100 or more, which is why good suppression of the excitation light is important for this application. The example of FIG. 9 shows that the filter has no significant spectral effect for wavelengths shorter than W(min). In the range of W(min), the excitation light is suppressed efficiently, i.e., the grating structure functions as a blocking filter. With longer wavelengths (W(max)), the filter allows a desired high transmission for the emitted fluorescence light (emission light).

Figure 10:
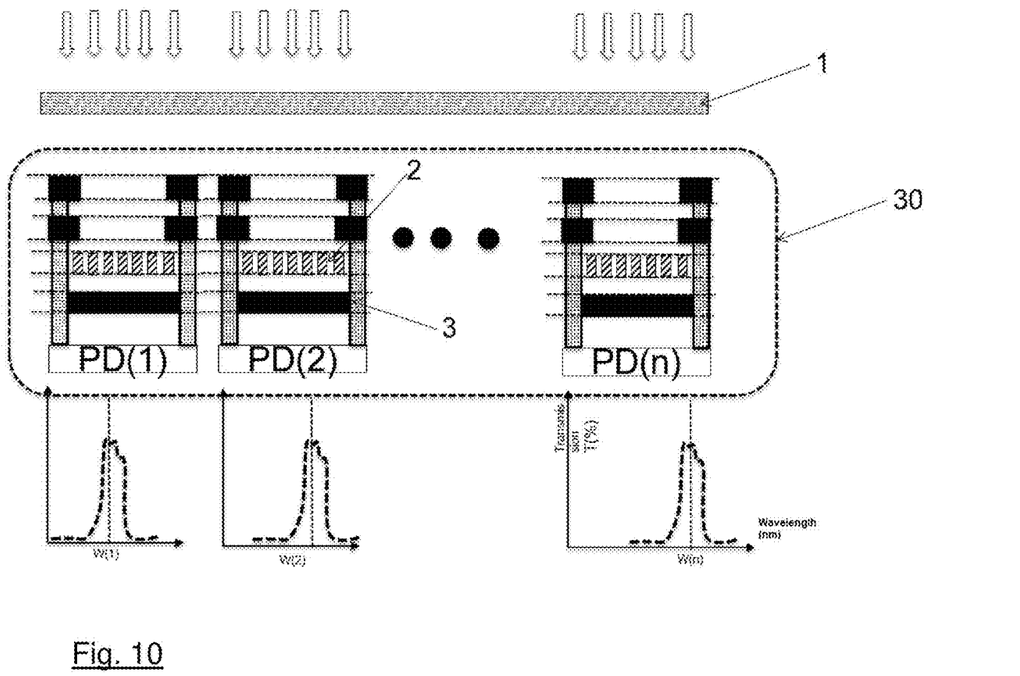
FIG. 10 shows an example of the construction of a multispectral sensor with several of the suggested optical filters.

FIG. 10 shows an example of a construction of a multispectral sensor which may also be produced with standard semiconductor technologies. The monolithic structure is designed in the form of an array as a 1D of 2D array. A photodetector PD with associated spectral filter represents a spectral channel. The multispectral sensor 30 in FIG. 10 has several such spectral channels, wherein each channel has its own spectral filter on the basis of intersecting transmission gratings 2, 3 according to the suggested optical filter. The individual channels differ according to their transmission ranges, as is indicated by the transmission diagrams in the bottom part of FIG. 10, and together the cover the desired spectral range from W(1) to W(n). The polarisation filter is located directly on or above the chip with the multispectral sensor 30. A polarisation film or a polarisation filtering coating, for example, may be applied directly to the chip as the polariser. Other solutions that generate linearly polarised light in a suitable orientation relative to the grating structures are also possible.

Figure 11:
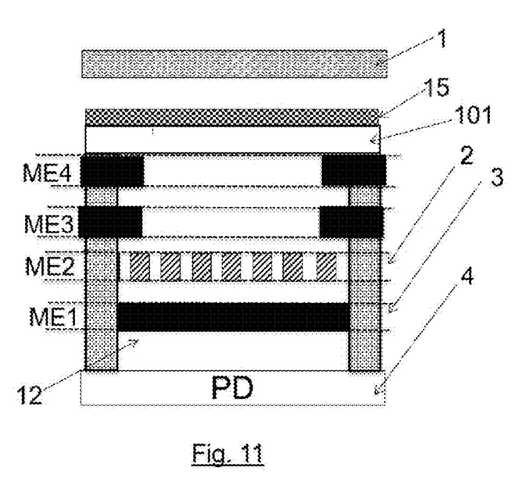
FIG. 11 shows a further example of a variant of the suggested optical filter and first optical sensor.
Figure 12:
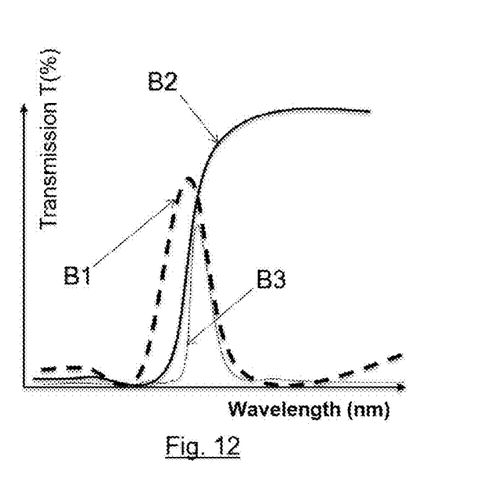
FIG. 12 shows an example of the resulting transmission of the optical filter in FIG. 11.

FIG. 11 shows an example of the suggested optical filter and the suggested first optical sensor, in which the grating-based spectral filter is combined with an additional external spectral filter 15. This makes it possible to optimise the filter parameters (e.g., the bandwidth) further. The example of FIG. 11 shows a passivation layer 101 with a spectral filter 15 over it. A colour filter similar to a Bayer pattern or a plasmonic filter may be used as filter 15, for example. This additional spectral filter 15 may be positioned either before or after the polariser 1 in the beam direction of the incident optical radiation. In this context, FIG. 12 shows the transmission of a red filter of a Bayer mask (spectral plot B2, red high pass filter) as an example of a colour filter 15, the transmission of a filter on the basis of the two intersecting transmission gratings 2, 3 (spectral plot B1) and the resulting product function (narrow bandpass filter, spectral plot B3). The aim of this example is to further reduce the spectral width of the grating-based filter. However, such a combination with an additional filter may also be used to create a better high pass or low pass filter.

Figure 13:
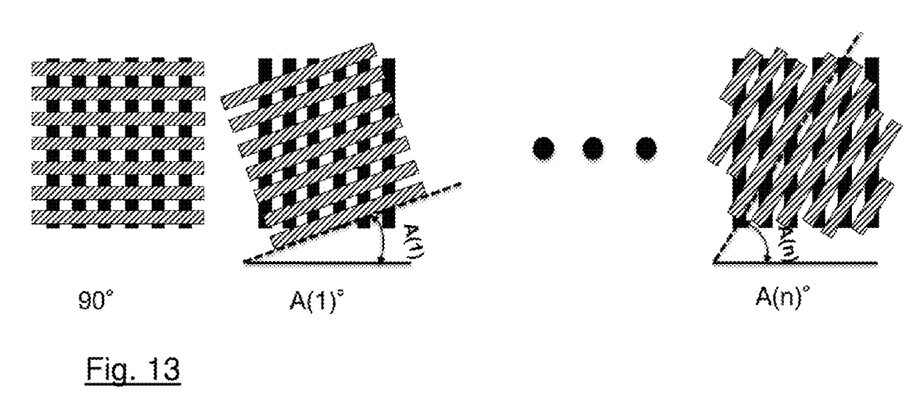
FIG. 13 shows an example of a variation of the angles between the transmission gratings of the suggested optical filter.

A further parameter for filter optimisation is the angle between the two transmission gratings 2, 3. It is not only possible to position one of the gratings with an offset of 90° relative to the other grating, it can also be positioned at various other angles≠90°. However, in this case the position of the cut-off edge (see also region F in FIG. 4) does not change as much as when the grating wire width or the grating period is changed. In the case of gratings with the period from 400 nm, for example, the difference between the central wavelength with an angle between the gratings of 90° compared with an angle between the gratings of 70° is about 15 nm. This capability to the deviate from an angle of 90° may therefore be used to tune the filter characteristic more precisely. In this regard, FIG. 13 suggests an example of a row with multiple photodiodes or pixels with various filters according to the present invention. The first element (far left) has gratings which are arranged at right angles to each other, in the next element the gratings are at an angle of A(1)° to each other, . . . and in the last photodiode or the last element (far right) the gratings are at an angle of A(n)° to each other.

Figure 14:
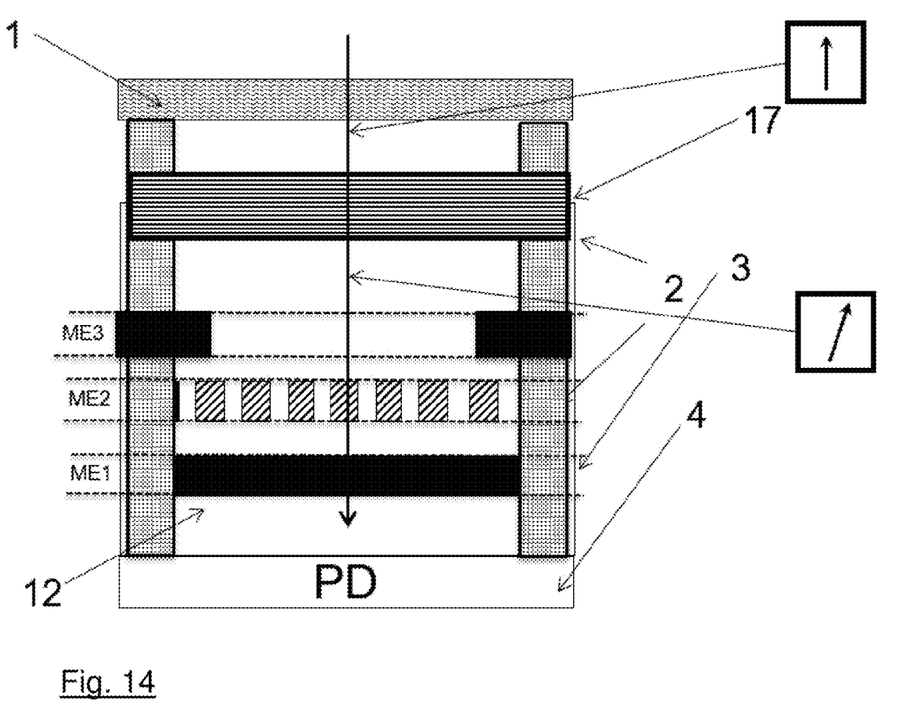
FIG. 14 shows a further example of a variant of the suggested optical filter and first optical sensor.

FIG. 14 shows a further alternative for fine tuning the filter characteristic in the suggested optical filter. Instead of adjusting the angle between the gratings, the polarisation angle of the incident optical radiation may also be changed. In this case, the angle between the two gratings remains at 90°, but the polarisation vector of the incident light is rotated. On this point, FIG. 14 shows how unpolarised or partially polarised light is polarised linearly by the polariser 1 and then passes through the optically anisotropic material 17. In this circumstance, two known effects can be used, the Kerr effect or the Faraday effect. The Faraday effect is a magneto-optical effect, the Kerr effect is an electro-optical effect. In both cases, a change is made to the optical properties (birefringence) of the anisotropic material 17 by the application of an electrical or magnetic field. Accordingly, in the example shown a suitable magnetic or electrical field is applied via the optically anisotropic material 17 in order to rotate the polarisation plane of the linearly polarised electromagnetic waves before they reach the intersecting transmission gratings. In this way, the angle of polarisation is changed. The optical anisotropic material 17 may be a dielectric layer, which is for example a component of the layer construction in the semiconductor process, or an external anisotropic medium, which may be placed on the passivation layer of the semiconductor process for example. The polarisation angle can be adjusted by controlling the magnetic or electrical field applied.

Figure 15:
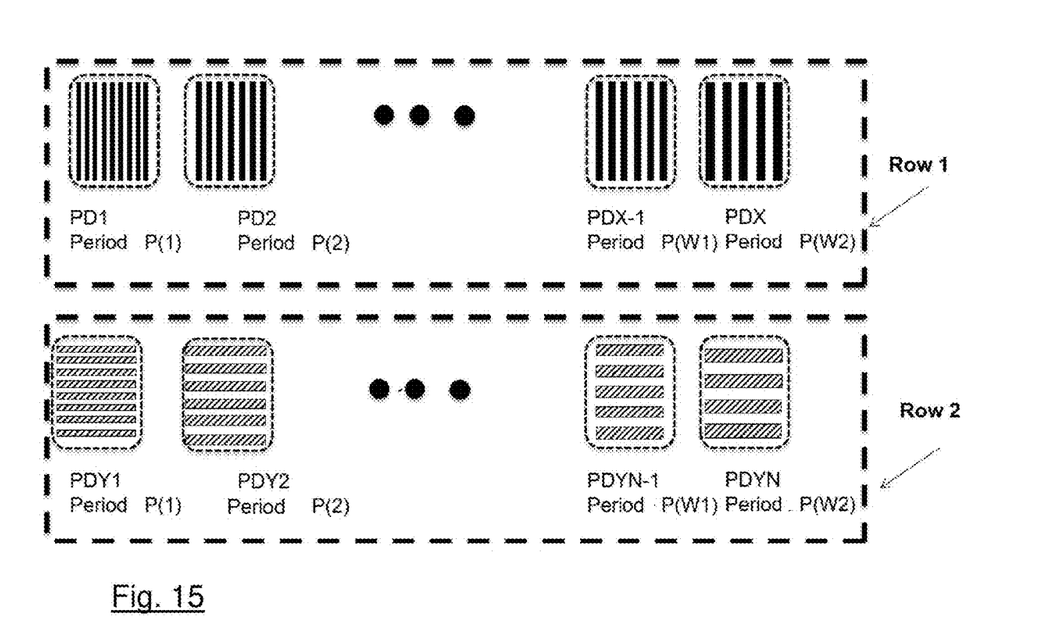
FIG. 15 shows an example of a variation of the suggested second optical sensor.

FIG. 15 shows a further possibility for producing an optical filter on the basis of the at least two intersecting transmission gratings. On this point, for exemplary purposes FIG. 15 shows a two-row photodiode array, in which a transmission grating having grating wires oriented at an angle of 0° or 90° with respect to a reference axis is arranged above each photodiode PD, wherein the grating period varies from P(1) to P(W2). In this example, all photodiodes PD1 to PDX in row 1 have grating at the 90° angle, and the grating period changes from P(1) to P(W2). The photodiodes PDY1 to PDYN in row 2 have gratings at an angle of 0°. The grating periods in row 2 also vary from the value P(1) to P(W2). And the grating wire widths can also change along each row, as is also indicated for exemplary purposes in the figure. It is also possible that more than two rows of such photodiodes are present (several photodiodes per grating orientation and grating period and/or grating wire width). It is also possible to furnish multiple photodiodes with the same grating structures in order to achieve a high signal-to-noise ratio by averaging the signals from these photodiodes.

By applying suitable mathematical methods, a spectral reconstruction can be made from the signals of the photodiodes, in which the spectrum of the incident radiation is calculated. A mathematical evaluation of N independent channels (photodiode with transmission grating) returns a good result in this context, although the transmission spectra of the individual gratings are relatively wide compared with conventional optical filters. In the variant of FIG. 15, the individual transmission gratings at the angles of 0° and 90° are physically separated from each other, i.e. placed side by side. A spectral channel (combination of grating-based filter and photodiode) only has either a 0° grating or a 90° grating. A good spectral reconstruction can be performed by a spectral reconstruction algorithm, wherein the number of individual channels is very important. The example represented enables a large number of different filters for very low cost, since the filters can be produced directly in the semiconductor process, and unlike the deposition of many thin film filters, for example, the manufacturing costs do not increase with the number of filter channels.

The spectral reconstruction may be carried out with the aid of a correction matrix for example. The associated algorithm has as its input values the signals from all photodiodes, and its outputs are the corrected values that together map the spectrum of the incident light.

Figure 16:
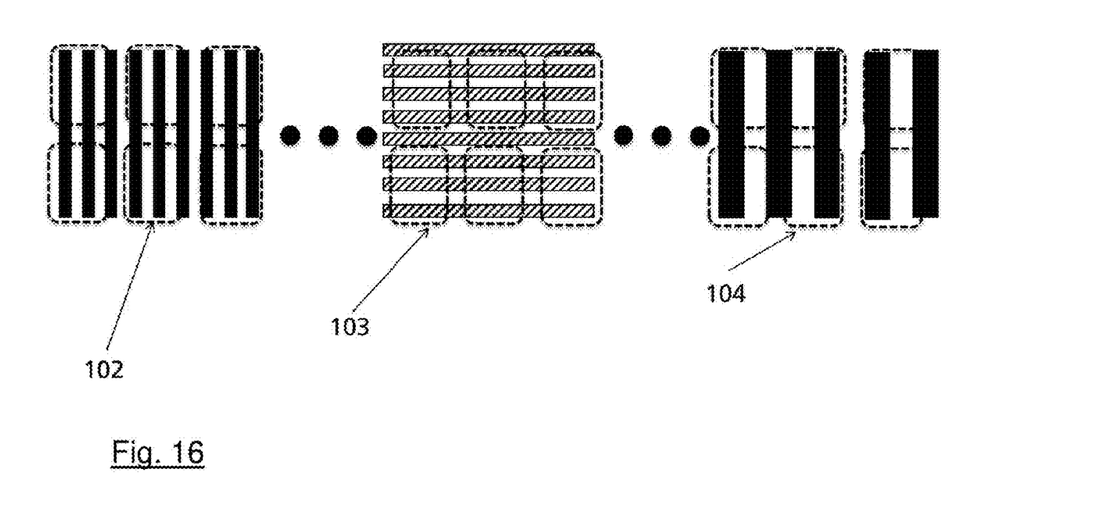
FIG. 16 shows a further example of a variant of the suggested second optical sensor.

FIG. 16 shows another capability of a variant of such kind. In this example, multiple photodiodes together form a 1D or 2D array. Parts of the 2D array (e.g., a subarray consisting of 6 pixels) are covered by a 90° grating 102 which has a period P(1). Another six photodiodes of a further subarray 103 are covered with 0° gratings which have a period of P(X). The last subarray 104 has 0° gratings with period P(n). This variant has advantages over the variant of FIG. 15, because boundary effects and diffraction are manifested much more weakly. In particular, it is possible to take a photodiode out of the middle of the respective subarray for evaluation in order to minimise the influence of boundary effects.

In the variants of FIGS. 15 and 16, the 0° gratings and the 90° gratings may each be formed in the same layer above the photodiodes or the photodiode array. However, this not absolutely necessary. Thus for example the 0° gratings may also be formed in a different layer than the 90° gratings.

Figure 17:
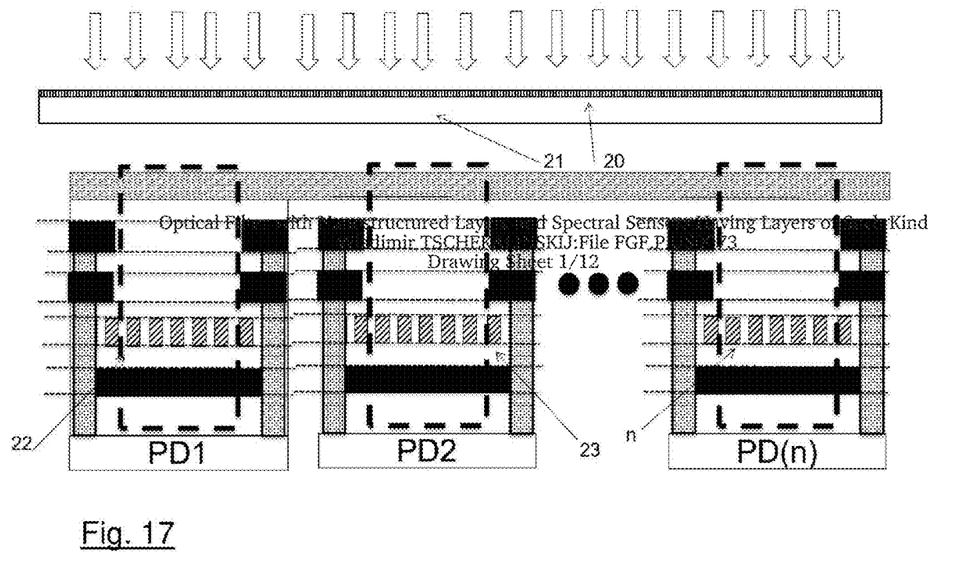
FIG. 17 shows a further example of a variant of the suggested first optical sensor.
Figure 18:
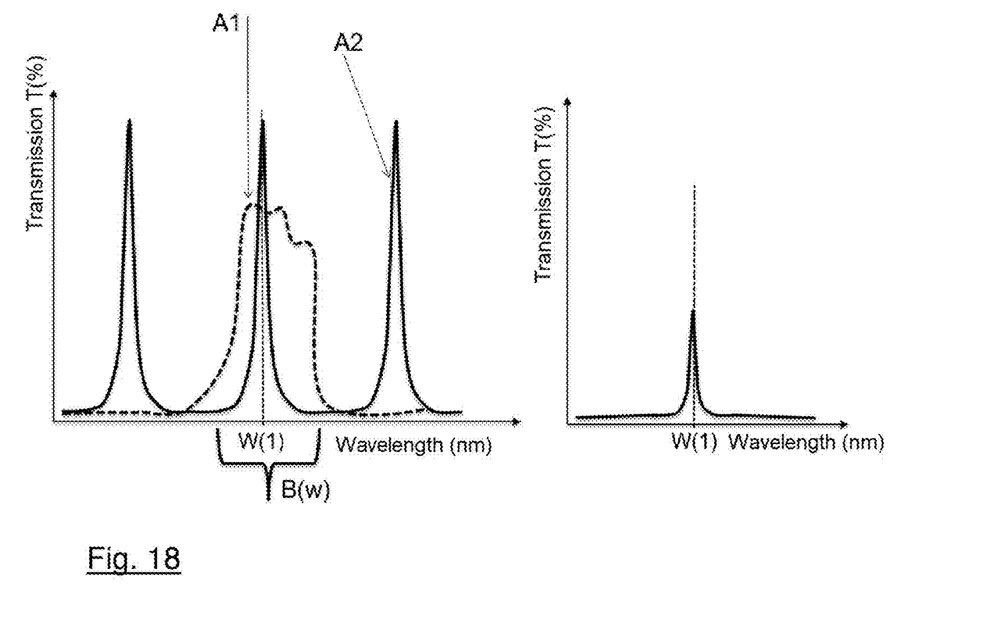
FIG. 18 shows an example of spectral properties of the optical sensor of FIG. 17.

For many applications, it is desirable that the spectral filter transmission have a Gauss-like shape and that it also have the narrowest possible bandwidth. This is difficult to achieve with the intersecting gratings of the suggested filter alone, because the edges of the TE and TM transmission are not sufficiently steep. Therefore, for an application of this kind the suggested filter is preferably supplemented with a Fabry-Perot or interference filter. FIG. 17 shows the structure of a multispectral sensor in a semiconductor process. The sensor is equipped with a Fabry-Perot filter 20, which is deposited on a glass substrate 21 (e.g., a window in the chip housing). It is known that the Fabry-Perot filter has a crest-like transmission spectrum consisting of several transmission peaks created by resonances (see also FIG. 18). The number of resonances defines the maximum number of narrow-band spectral channels. In the multispectral sensor of FIG. 17, all photodiodes from PD1 to PD(n) are covered with the Fabry-Perot filter 20. On the other hand, each photodiode PD also has its own filter in the two intersecting transmission gratings, embodied in the present example as a bandpass filter (see also transmission spectrum A1 of the filter of PD1 in FIG. 18). Photodiode PD1 has a bandpass filter 22, photodiode PD2 has bandpass filter 23 and photodiode PD (n) has bandpass filter n. Both the spectral transmission of the Fabry-Perot filter with the crest-like transmission peaks (transmission spectrum A2) and the spectral transmission of a grating-based bandpass filter (transmission spectrum A1) are represented schematically in FIG. 18. The transmission curve for the combination of the Fabry-Perot filter 20 with the bandpass filter 22 of photodiode PD1 is then shown on the right in FIG. 18.

Each photodiode of the multispectral sensor has its own grating-based filter with a curve similar to bandpass filter 22. Such a filter has only one high transmission for a defined wavelength range B (w), and the rest of the spectrum of the incident light is attenuated and blocked so that further peaks of the Fabry-Perot filter 20 are suppressed as intended (see also FIG. 18). In this way, only one Fabry-Perot filter is needed for an entire pixel array. The grating-based filter provides an easier way to suppress the undesirable secondary peaks than other filters of the related art, for example a further Fabry-Perot filter. Accordingly, as represented in FIG. 17, an array of spectral filters can be crated with only one Fabry-Perot filter but several different grating-based filters.

Figure 19:
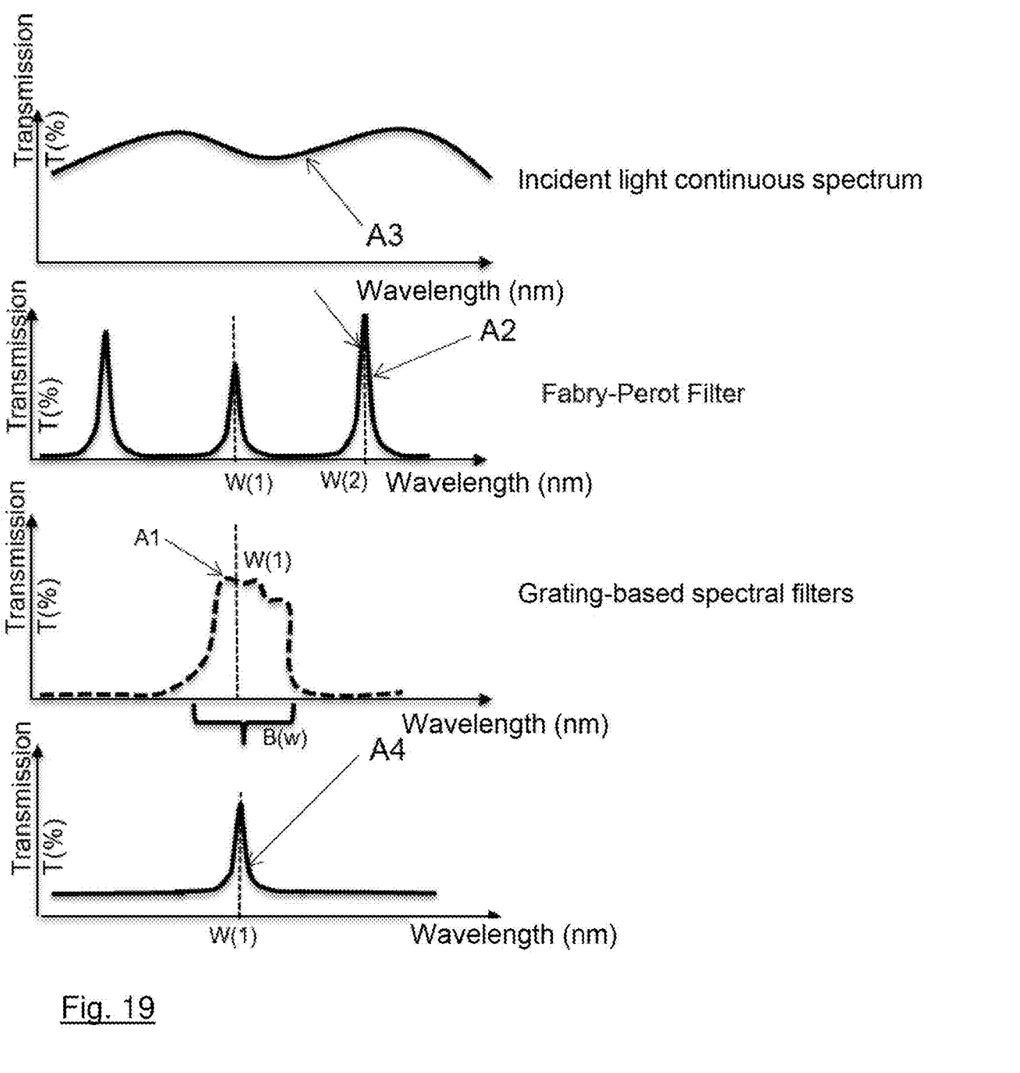
FIG. 19 shows an example of spectral properties of the suggested optical filter in combination with a Fabry-Perot filter.

FIG. 19 shows the ratios when producing a narrow-band filter by combining a Fabry-Perot filter and grating-based filter again with reference to the various spectral transmission curves. The incident light has a continuous spectrum with spectral plot A3. Spectral plot A2 shows the spectrum after the Fabry-Perot filter. This spectral plot includes a number of resonances, one resonance being at W(1). Two intersecting gratings and a polariser together form a bandpass filter with spectral plot A1 and central wavelength W(1). Spectral plot A4 shows the spectrum after filtering by the Fabry-Perot filter and by the bandpass filter based on the intersecting gratings. After passing through the two filters, the light has a narrow-band, rather Gaussian spectrum A4 with central wavelength W(1). The transmission spectrum A4 has a considerably reduced peak width at half height compared with the grating-based filter alone, and the filter transmission is practically Gaussian.

REFERENCE LIST

1 Polarisation filter and/or layer
2 First transmission grating
3 Second transmission grating
4 Photodiode
5-7 Dielectric layers
8-11 Metal layers
12 Dielectric layer
13 Photodiode
14 Dielectric layer
15 Colour filter
17 Optically anisotropic material
20 Fabry-Perot filter 21 Glass substrate
22 Bandpass filter
23 Bandpass filter
30 Multispectral sensor
101 Passivation layer
102 Subarray with 90° gratings
103 Subarray with 0° gratings
104 Subarray with 0° gratings

The invention claimed is:

1. An optical filter with nanostructured layers which forms a layer stack having at least
   a first nanostructured layer which forms a first transmission grating from grating wires extending parallel to each other, and
   a second nanostructured layer arranged over the first nanostructured layer, which forms a second transmission grating from grating wires extending parallel to each other,
characterized in that
the first nanostructured layer and the second nanostructured layer are metal layers;
the grating wires of the first transmission grating extend at an angle to the grating wires of the second transmission grating, and an optical polariser is arranged over the second nanostructured layer which linearly polarises incident optical radiation parallel to the grating wires of one of the two transmission gratings; and
wherein grating parameters of the two transmission gratings are tuned to one another in such manner as to produce a bandpass filter characteristic at a desired wavelength range, or a low-pass or high-pass filter characteristic.

2. The optical filter according to claim 1, characterized in that
   a layer of an optically anisotropic material is arranged between the optical polariser and the nanostructured layers, by means of which the direction of polarisation of the incident optical radiation can be changed, in particular through the Kerr or Faraday effect.

3. The optical filter according to claim 1, characterized in that
   the grating wires of the first transmission grating are aligned at an angle of 90° to the grating wires of the second transmission grating.

4. The optical filter according to claim 1, characterized in that
   one or more further optical filters are arranged in a beam path of the optical radiation.

5. A spectral sensor having at least one photodetector, in front of which a layer stack is formed from dielectric and structured metal layers and an optical filter according to claim 1 is arranged, through which optical radiation incident on a light input side of the sensor is filtered before it reaches the photodetector.

6. The spectral sensor according to claim 5, characterized in that
   a number of the photodetectors are arranged side by side with the optical filters on a substrate, wherein at least some of the optical filters have different spectral characteristics.

7. The spectral sensor according to claim 6, characterized in that
   a Fabry-Perot filter is arranged in a beam path of the optical radiation, which filter extends over the multiple photodetectors with the optical filters.

8. The optical filter according to claim 1, characterized in that
   the first and second nanostructured layers form a monolithic structure.

9. An optical filter with nanostructured layers which forms a layer stack having at least
   a first nanostructured layer which forms a first transmission grating from grating wires extending parallel to each other, and
   a second nanostructured layer arranged over the first nanostructured layer, which forms a second transmission grating from grating wires extending parallel to each other,
characterized in that
a Fabry-Perot filter is arranged in a beam path of the optical radiation:
the grating wires of the first transmission grating extend at an angle to the grating wires of the second transmission grating, and an optical polariser is arranged over the second nanostructured layer which polariser linearly polarises incident optical radiation parallel to the grating wires of one of the two transmission gratings; and
wherein grating parameters of the two transmission gratings are tuned to one another in such manner as to produce a bandpass filter characteristic at a desired wavelength range, or a low-pass or high-pass filter characteristic.

* * * * *